United States Patent [19]

Hibbert et al.

[11] Patent Number: 4,957,447
[45] Date of Patent: Sep. 18, 1990

[54] ELECTRIC POWER BUSWAY PLUG ALIGNMENT ARRANGEMENT

[75] Inventors: David A. Hibbert, South Windsor, Conn.; Lynn M. Harton; John D. Anderson, both of Selmer, Tenn.; Anthony L. Richards, Southington, Conn.

[73] Assignee: General Electric Company, Plainville, Conn.

[21] Appl. No.: 401,306

[22] Filed: Aug. 31, 1989

[51] Int. Cl.$^5$ .............................................. H01R 25/16
[52] U.S. Cl. ..................................... 439/207; 439/113
[58] Field of Search ............... 439/110, 113, 114, 116, 439/119, 207, 208, 210, 211, 212, 213, 374, 376, 378, 677, 678, 679, 680

[56] References Cited

U.S. PATENT DOCUMENTS

| 2,725,542 | 11/1955 | Burn et al. | 439/114 |
|---|---|---|---|
| 3,015,795 | 1/1962 | Meacham | 439/116 |
| 3,354,352 | 11/1967 | Goodridge | 317/100 |
| 4,804,804 | 2/1989 | Hibbert et al. | 174/16.2 |
| 4,820,178 | 4/1989 | Anderson et al. | 439/212 |

FOREIGN PATENT DOCUMENTS 3437585 4/1986 Fed. Rep. of Germany ...... 439/113

OTHER PUBLICATIONS

Ser. No. 281,415 entitled "Insulated Electrical Power Distribution Busway Tabs", filed 12/8/88, Harton et al. Docket 41PR-6726.

*Primary Examiner*—Eugene F. Desmond
*Attorney, Agent, or Firm*—Richard A. Menelly; Walter C. Bernkopf; Fred Jacob

[57] ABSTRACT

A locating and alignment pin provided on the bottom of an electric busway switch provides immediate location of the switch connector clips with respect to the busway connector tabs while, at the same time, aligning the switch interlock with the corresponding interlock slot formed within the busway housing while adding to the mechanical support between the electric busway switch and the busway housing. The locating and alignment pin is received within a corresponding locating aperture formed in the top surface of the busway housing next to the busway plug outlet box.

7 Claims, 2 Drawing Sheets

ELECTRIC POWER BUSWAY PLUG ALIGNMENT ARRANGEMENT

BACKGROUND OF THE INVENTION

Electric bus bars are electrically insulated from each other and from the busway housing by means of an epoxy coating as described within U.S. Pat. No. 4,804,804. The bus bars and the housing sideplates are fastened together by means of an insulated bolt that transfers through apertures formed within the bus bars and the housing sideplates. U.S. Pat. application Ser. No. 281,415 filed Dec. 8, 1988 entitled "Insulated Electrical Power Distribution Busway Tabs" describes plug-in stabs that are attached to the respective bus bars for electrical connection within an industrial power distribution circuit. This Patent Application is incorporated herein for reference purposes and should be reviewed for a description of the use of plug-in stabs that are arranged for connection with an electric busway switch. One such switch being described within U.S. Pat. No. 3,354,352 which Patent is incorporated herein for reference purposes. An electric outlet box which insulates and protects the bus bar stabs is described in U.S. Pat. 4,820,178 which Patent is also incorporated herein for reference purposes. When making electrical connection between the electric busway switch and the electric busway system, it is important that the connector clips extending from the bottom of the electric busway switch exactly align with the bus bar tabs extending upward from the busway system in order to prevent damage to the busway tabs. It is also important to ensure that the respective connector clips become attached to the respective bus bar tabs within the proper phases of the electrical power distribution circuit.

One purpose of the instant invention accordingly is to provide an electric busway switch that properly aligns and connects with an electric busway system without substantial modification to either the electric busway switch or the busway system.

SUMMARY OF THE INVENTION

A locating and alignment pin is secured to the bottom of an electric busway switch respective to the electric busway switch connector clips and interlock lever. A corresponding locating aperture is provided in the top surface of the electric busway housing relative to the busway plug outlet box. The electric busway switch is traversed along the busway rails until the locating and alignment pin enters within the busway housing locating aperture. The connector clips can then be attached to the upstanding bus bar tabs to complete the electrical connection.

DESCRIPTION OF THE PREFERRED EMBODIMENT

Figure 1:
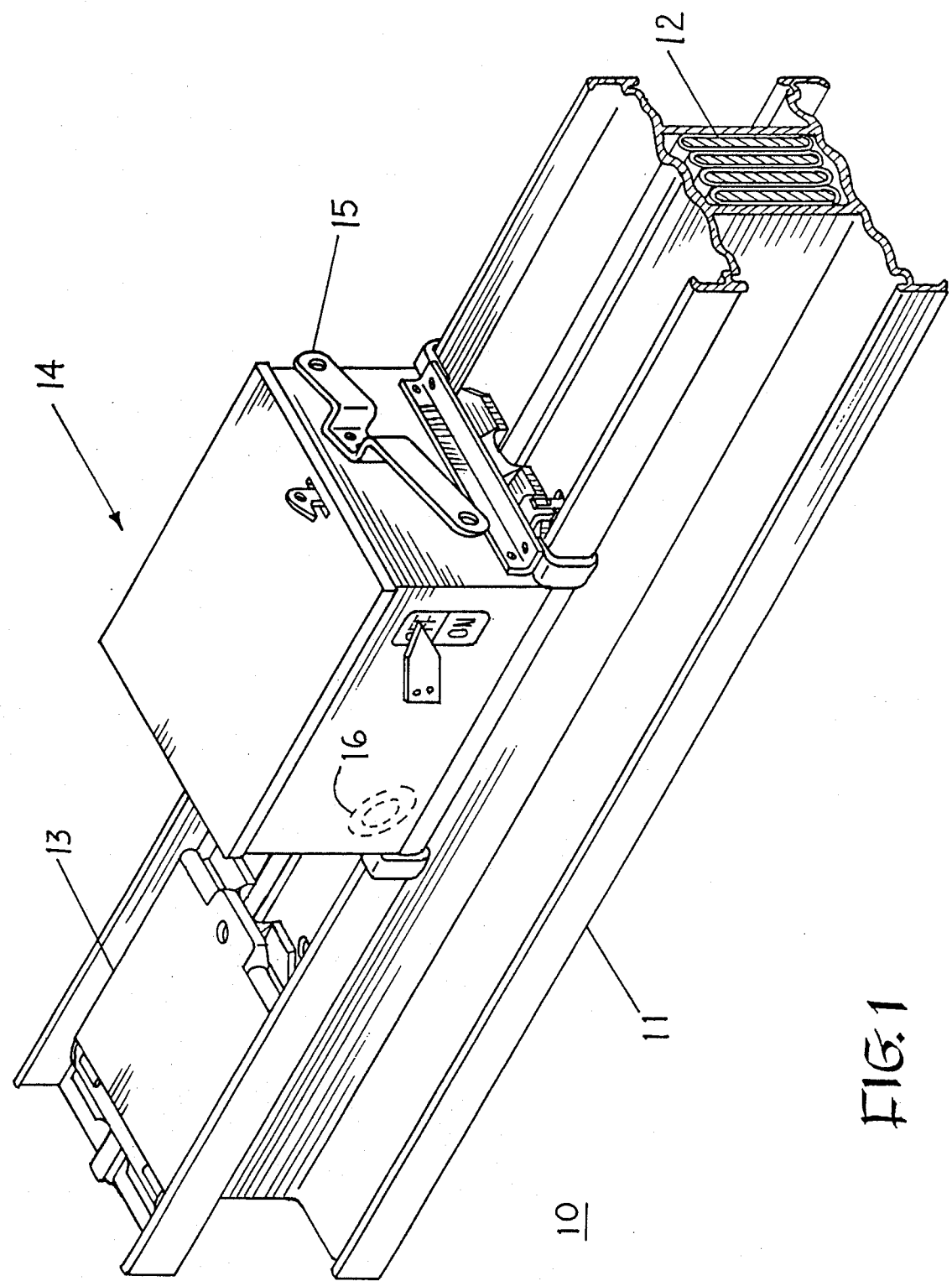
FIG. 1 is a top perspective view of the electric busway switch connected to the electric busway system in accordance with the invention.
Figure 2:
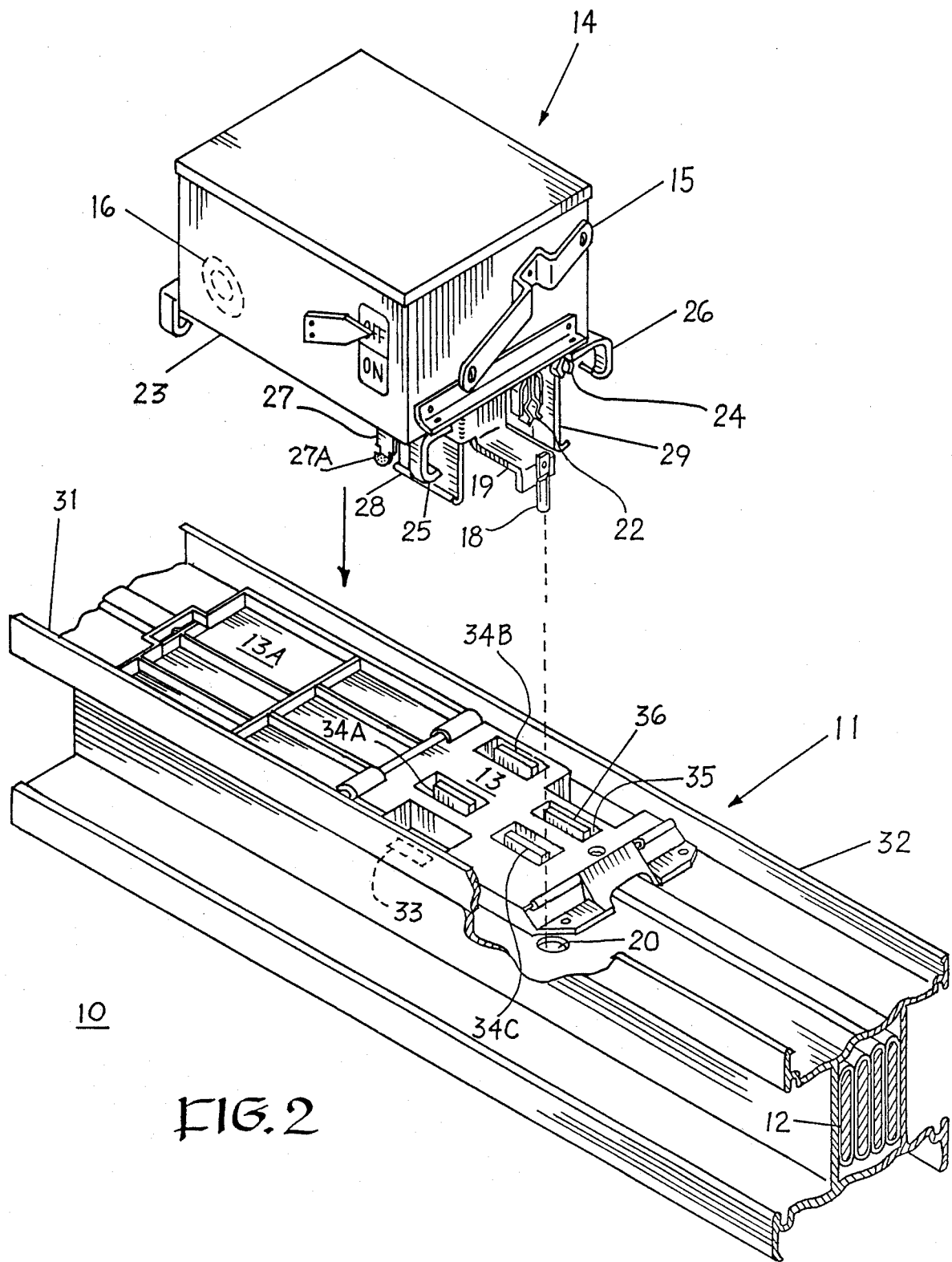
FIG. 2 is a top perspective view of the busway system of FIG. 1 with the electric busway switch in isometric projection.

A busway system 10 similar to that described within aforementioned U.S. Pat. 4,804,804, which Patent is incorporated herein for reference purposes is depicted in FIG. 1. The busway system consists of a housing 11 fabricated from an aluminum alloy having high tensile strength and excellent thermal conductive properties. The bus bars 12 are arranged within the housing and electrical access is provided to the bus bars by means of a busway plug outlet box 13. An electric busway switch 14 interconnects with the bus bars and provides connection with electrical take-off cables through knock-out 16 provided in the side of the switch. An operating handle 15 provides ON - OFF connections with the bus bars and related electrical equipment through the connector cables (not shown). The electric busway switch 14 is shown prior to connection with the electric busway system 10 in FIG. 2.

When making electrical connection between the phase connector clips 22, depending from the bottom 23 of the electric busway switch 14, and the corresponding tabs 34A-34C, which are attached to corresponding bus bars 12, the electric busway switch is arranged over the busway outlet box 13 with the cover 13A in its open position. The ground contact plates 28, 29 on the electric busway switch are arranged intermediate the upstanding side rails 31, 32 on the electric busway housing 11. The ground contact plates 28, 29 on the bottom of the electric busway switch are positioned on the side rails and the electric busway switch is moved along the top of the busway outlet box until the locating and alignment pin 18 attached to the bottom 23 of the electric busway switch by means of angulated bracket 19 falls within the locating aperture 20 formed in the top surface of the housing. The electric busway switch is then pressed downward whereby the phase connector clips 22 engage the corresponding connector tabs 34A-34C that extend up through slots 35 formed in the busway outlet box while the neutral connector clip 24 on the electric busway switch connects with the neutral tab 36 within the busway outlet box. At this time, the interlock lever 27 extends within the interlock slot 33 formed in the bottom of the busway housing. The hook portion of the interlock lever is coated with an epoxy or similar insulating coating as depicted at 27A. Securing clamps 25, 26 are fastened to housing 11 to complete the installation of the electric busway switch. Electric power connection between the electric busway switch and associated electrical equipment cable (not shown) is made by removing the knock-out 16 when such knock-outs are employed. The electric busway switch is then turned from its OFF to its ON condition by means of the operating handle 15.

A simple and economical means in the form of a locating and alignment pin in cooperation with a locating aperture for aligning an electric busway switch with an electric busway system has herein been described.

Having thus described our invention, what we claim as new and desire to secure by Letters Patent is:

1. An electric power busway switch comprising:
   an electric switch enclosure having means for connecting between said switch enclosure and associated power equipment;
   a plurality of connector clips depending from a bottom of said switch enclosure and arranged for plugging onto a corresponding plurality of vertically arranged busway tabs extending from a top of a power busway enclosure said busway tabs being attached to corresponding bus conductors horizontally arranged within said busway enclosure;
   a neutral connector clip depending from said bottom and arranged for plugging onto a corresponding neutral tab extending from said top of said busway enclosure; and a locating pin depending from said bottom and arranged for plugging into means arranged on said busway enclosure for positioning said connector clips relative to said busway tabs.

2. The busway switch of claim 1 including an opposing pair of side pieces on said switch enclosure and opposing side rails on said busway enclosure, said side pieces being supported upon said side rails.

3. The busway switch of claim 2 wherein said side pieces include means for fastening said enclosure to said side rails.

4. The busway switch of claim 1 wherein said means on said busway enclosure comprises an aperture arranged a predetermined distance from said busway tabs and said neutral tab.

5. The busway switch of claim 1 wherein said locating pin is attached to said bottom of said enclosure by an angulated bracket.

6. The busway switch of claim 1 including a busway outlet on said busway enclosure under said switch enclosure.

7. The busway switch of claim 6 wherein said busway outlet includes a plurality of slots through which said busway tabs project, said aperture being arranged a predetermined distance from said slots.

* * * * *